United States Patent
Baba et al.

(10) Patent No.: US 11,557,777 B2
(45) Date of Patent: Jan. 17, 2023

(54) FUEL CELL SYSTEM, EQUIPMENT MANAGEMENT METHOD, MANAGEMENT APPARATUS, AND EQUIPMENT MANAGEMENT SYSTEM

(71) Applicant: KYOCERA Corporation, Kyoto (JP)

(72) Inventors: Masahiro Baba, Kawasaki (JP); Shinji Aikawa, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 177 days.

(21) Appl. No.: 16/632,878

(22) PCT Filed: Jul. 26, 2018

(86) PCT No.: PCT/JP2018/028109
§ 371 (c)(1),
(2) Date: Jan. 22, 2020

(87) PCT Pub. No.: WO2019/022198
PCT Pub. Date: Jan. 31, 2019

(65) Prior Publication Data
US 2020/0212464 A1    Jul. 2, 2020

(30) Foreign Application Priority Data
Jul. 28, 2017 (JP) .............................. JP2017-146463

(51) Int. Cl.
*H01M 8/04303* (2016.01)
*H01M 8/04664* (2016.01)
(Continued)

(52) U.S. Cl.
CPC ... *H01M 8/04303* (2016.02); *H01M 8/04679* (2013.01); *H01M 8/04225* (2016.02); *H01M 8/04228* (2016.02); *H01M 8/04302* (2016.02); *H01M 8/04671* (2013.01); *H01M 8/04686* (2013.01); *H01M 8/04955* (2013.01); *H01M 2250/20* (2013.01)

(58) Field of Classification Search
CPC ......... H01M 8/04303; H01M 8/04302; H01M 8/04671; H01M 8/04679; H01M 8/04955; H01M 8/04228; H01M 8/04225; H01M 2250/20
See application file for complete search history.

(56) References Cited

U.S. PATENT DOCUMENTS 8,765,313 B2   7/2014  Kurita et al.
9,847,650 B2   12/2017 Nakamura
(Continued)

FOREIGN PATENT DOCUMENTS

JP   2005-182399 A   7/2005
JP   200884730 A     4/2008
(Continued)

*Primary Examiner* — Ula C Ruddock
*Assistant Examiner* — Matthew W Van Oudenaren
(74) *Attorney, Agent, or Firm* — Hauptman Ham, LLP

(57) ABSTRACT

A fuel cell system comprises a controller configured to determine whether a condition relating to a stop pattern of the fuel cell system satisfies a predetermined condition, and an output unit configured to output a warning when it is determined that the condition relating to the stop pattern satisfies the predetermined condition.

9 Claims, 4 Drawing Sheets

(51) Int. Cl.
*H01M 8/04955* (2016.01)
*H01M 8/04225* (2016.01)
*H01M 8/04302* (2016.01)
*H01M 8/04228* (2016.01)

(56) References Cited

U.S. PATENT DOCUMENTS

| | | | | |
|---|---|---|---|---|
| 2004/0081870 A1* | 4/2004 | Miyazawa | ........ | H01M 8/04228 |
| | | | | 429/429 |
| 2015/0207328 A1* | 7/2015 | Nakamura | ........ | H02J 13/00026 |
| | | | | 307/153 |
| 2016/0321564 A1 | 11/2016 | Imahara et al. | | |
| 2018/0294490 A1* | 10/2018 | Nakata | .............. | H01M 8/04067 |

FOREIGN PATENT DOCUMENTS

| | | | |
|---|---|---|---|
| JP | 2011-34736 A | | 2/2011 |
| JP | 2013-225445 A | | 10/2013 |
| JP | 2013225445 | * | 10/2013 |
| JP | 201432941 A | | 2/2014 |
| JP | 2014053177 | * | 3/2014 |
| JP | 2015-191863 A | | 11/2015 |
| WO | 2015108179 A1 | | 7/2015 |

* cited by examiner

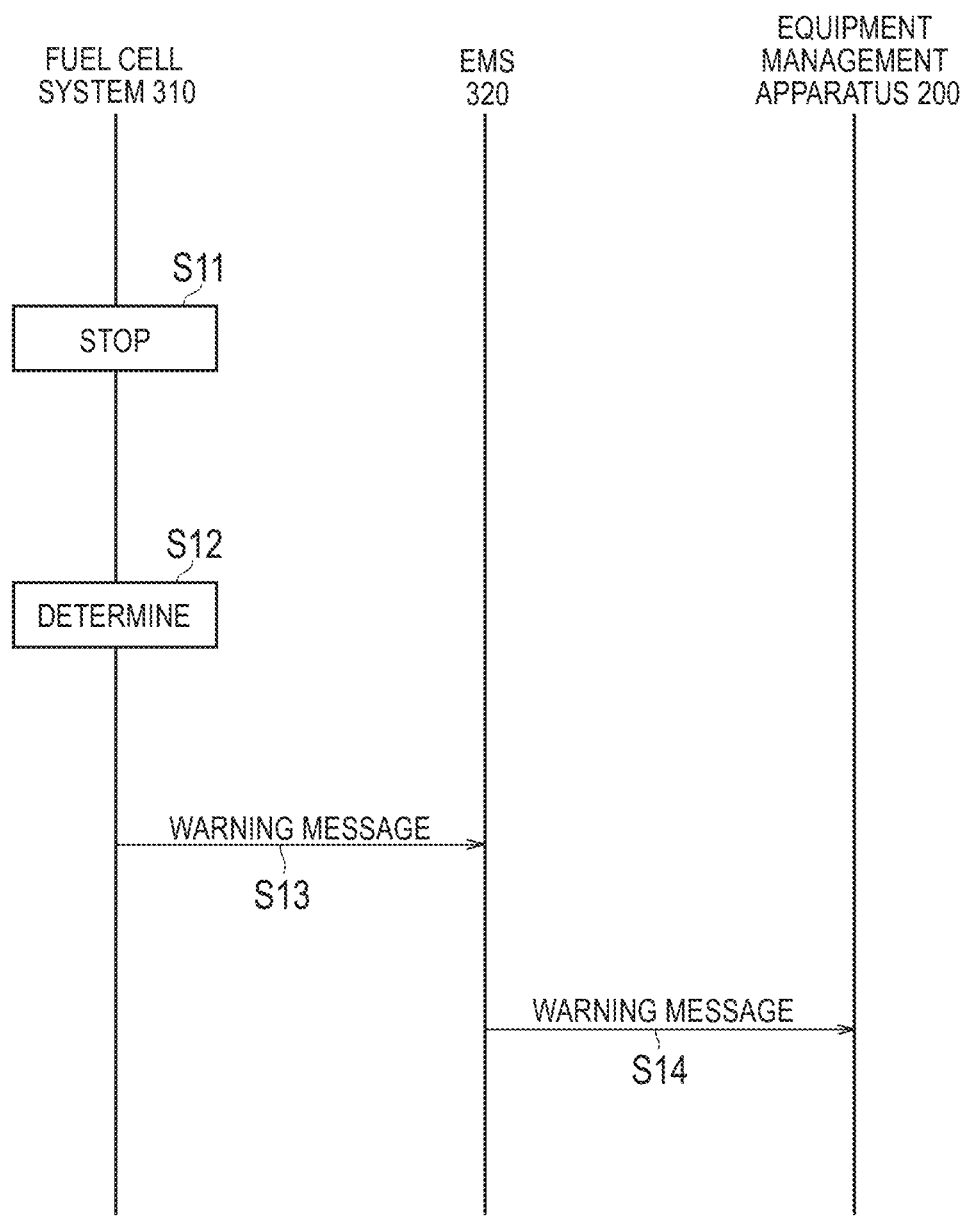

_US 11,557,777 B2_

FUEL CELL SYSTEM, EQUIPMENT MANAGEMENT METHOD, MANAGEMENT APPARATUS, AND EQUIPMENT MANAGEMENT SYSTEM

RELATED APPLICATIONS

The present application is a National Phase of International Application No. PCT/JP2018/028109, filed Jul. 26, 2018, and claims priority based on Japanese Patent Application No. 2017-146463, filed Jul. 28, 2017.

TECHNICAL FIELD

The present invention relates to a fuel cell system, an equipment management method, a management apparatus, and an equipment management system.

BACKGROUND ART

An equipment management system that manages various types of information regarding a plurality of pieces of equipment is known. Examples of the various types of information include basic information and maintenance information regarding the equipment. The basic information includes, for example, an installation date, a prescribed useful life, and a rated power consumption. The maintenance information includes past maintenance record (e.g., Patent Literature 1).

CITATION LIST

Patent Literature

Patent Literature 1: Japanese application publication No. 2005-182399

SUMMARY OF INVENTION

A fuel cell system according to a first feature comprises a controller configured to determine whether a condition relating to a stop pattern of the fuel cell system satisfies a predetermined condition, and an output unit configured to output a warning when it is determined that the condition relating to the stop pattern satisfies the predetermined condition.

An equipment management method according to a second feature comprises the steps of determining whether a condition relating to a stop pattern of a fuel cell system satisfies a predetermined condition, and outputting a warning when it is determined that the condition relating to the stop pattern satisfies the predetermined condition.

A management apparatus according to a third feature is connected to a fuel cell system via at least one of a narrow area network and a wide area network. The management apparatus comprises a receiver configured to receive a warning when a condition relating to a stop pattern of the fuel cell system satisfies a predetermined condition.

An equipment management system according to a forth feature comprises a fuel cell system, and a management apparatus connected to the fuel cell system via at least one of a narrow area network and a wide area network. The equipment management system comprises a controller configured to determine whether a condition relating to a stop pattern of the fuel cell system satisfies a predetermined condition, and an output unit configured to output a warning to the management apparatus when it is determined that the condition relating to the stop pattern satisfies the predetermined condition.

BRIEF DESCRIPTION OF DRAWINGS

FIG. 4 is a diagram illustrating an equipment management method according to the embodiment.

DESCRIPTION OF EMBODIMENTS

Figure 1:
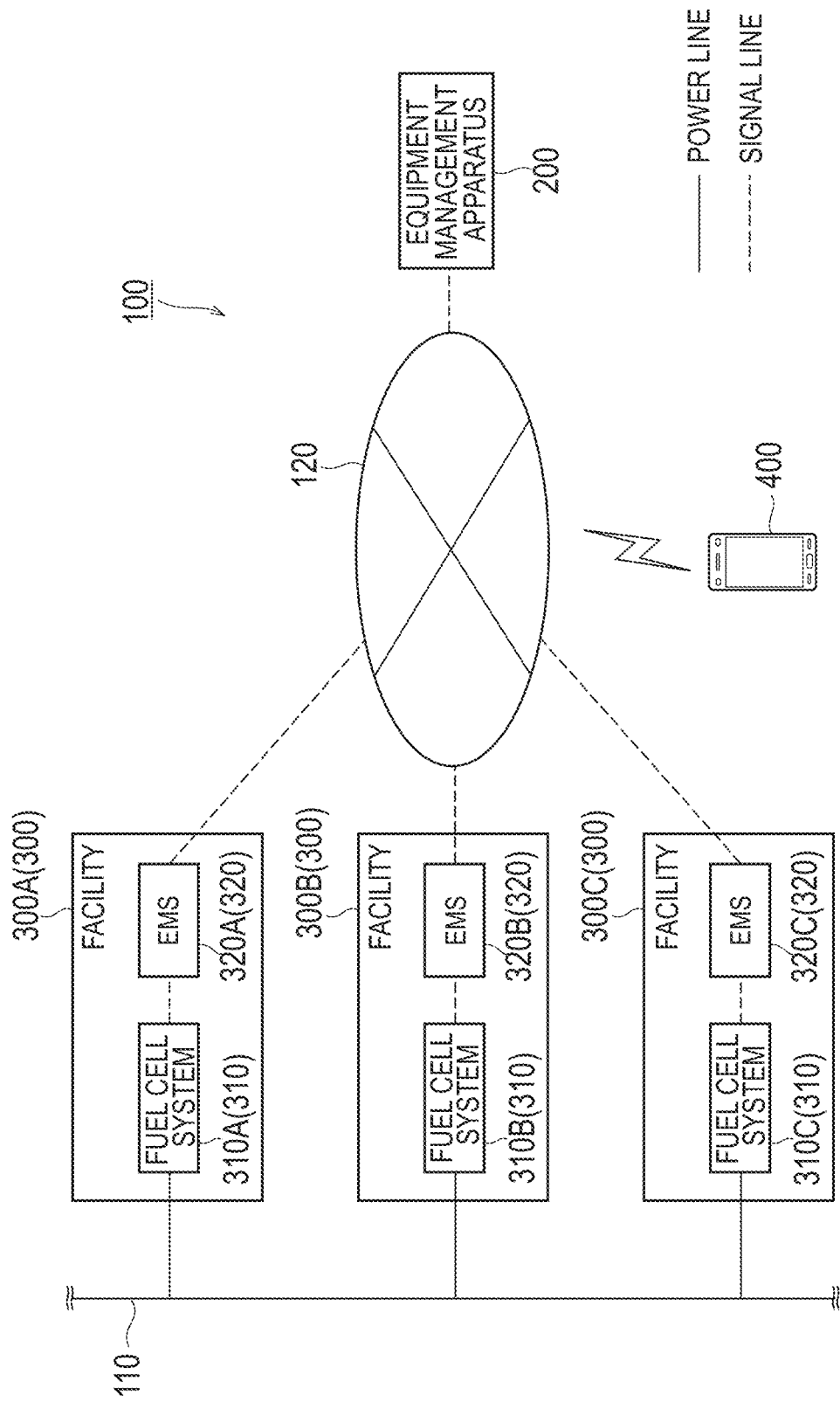
FIG. 1 is a diagram illustrating an equipment management system 100 according to an embodiment.

An embodiment will be described below with reference to the drawings. In the description below with reference to the drawings, the same or similar portions are denoted by the same or similar reference numerals.

However, it should be noted that the drawings are schematic, and dimensional ratios and the like may differ from actual ones. Thus, specific dimensions and the like should be determined in consideration of the description below. Further, it goes without saying that the drawings may include portions that differ in dimensional relationship or ratio between one drawing and another.

SUMMARY OF DISCLOSURE

Meanwhile, there may be a case in which equipment to be managed by an equipment management system is a fuel cell system. Since fuel cell systems can be operated by users, it is necessary to assume a situation where the fuel cell system is frequently stopped by a user operation.

However, frequent stopping of the fuel cell system may prevent appropriate control of the fuel cell system. It is therefore preferable to avoid a situation where the fuel cell system stops frequently.

To solve the problem described above, the disclosure below describes a fuel cell system, an equipment management method, a management apparatus, and an equipment management system that allow for suppression of a situation where the fuel cell system stops frequently.

Embodiments (Equipment Management System)

The equipment management system according to the embodiment will be described below. As illustrated in FIG. 1, an equipment management system 100 has an equipment management apparatus 200, a facility 300, and a predetermined terminal 400. In FIG. 1, facilities 300A to 300C are illustrated as the facility 300. The equipment management apparatus 200 and the facility 300 are connected to a network 120. The network 120 provides a line (wide area network) between the equipment management apparatus 200 and the facility 300 (to be more specific, a router disposed in the facility 300). The network 120 may provide a line between the equipment management apparatus 200 and the predetermined terminal 400. The network 120 may be, for example, the Internet or a mobile communication network. The network 120 may provide a dedicated line such as a VPN. The network 120 may be considered as an out-of-home network in a sense that the network 120 provides a line for communication with an apparatus disposed outside the facility 300.

The equipment management apparatus 200 manages equipment disposed in the facility 300. Details of the equipment management apparatus 200 will be described later (see FIG. 3).

The facility 300 has a fuel cell system 310 and an EMS 320. The fuel cell system 310 includes equipment that generates power by using fuel gas. Details of the fuel cell system 310 will be described later (see FIG. 2). The EMS 320 is equipment (energy management system) that controls equipment disposed in the facility 300. Here, a line between the fuel cell system 310 and the EMS 320 is provided by a narrow area network. The narrow area network is, for example, a network including the router disposed in the facility 300. The narrow area network may be a near field communication network such as Bluetooth (registered trademark) or Wi-SAN. The narrow area network may be considered as a home network in a sense that the narrow area network provides a line for communication with an apparatus disposed in the facility 300. However, the apparatus disposed in the facility 300 may not be disposed indoors in the facility 300 but may be disposed on the premises of the facility 300.

The facility 300 may have load equipment that consumes power. The load equipment is, for example, air-conditioning equipment, lighting equipment, or audio visual (AV) equipment. The facility 300 may have a distributed power supply other than the fuel cell system 310. The distributed power supply may include, for example, equipment that generates power by utilizing natural energy such as sunlight, wind power, or geothermal heat, or may include storage battery equipment.

The predetermined terminal 400 may be a terminal owned by a manager who manages equipment disposed in the facility 300. The predetermined terminal 400 may be a terminal owned by a worker who performs maintenance of equipment disposed in the facility 300. The predetermined terminal 400 may be a terminal that belongs to a business such as a power generation business, a power transmission/distribution business, or a retail business. The predetermined terminal 400 may be a smartphone, a tablet terminal, or a personal computer. The predetermined terminal 400 may be considered as an example of a management apparatus connected to the fuel cell system 310 via at least one of the narrow area network and the wide area network.

Here, the equipment management system 100 may have a power management server. The power management server transmits, to the facility 300, a power flow control message requesting control of the amount of power flow from a power grid 110 to the facility 300, a reverse power flow control message requesting control of the amount of reverse power flow from the facility 300 to the power grid 110, or a power supply control message requesting control of the fuel cell system 310 (distributed power supply) disposed in the facility 300, for example.

In the embodiment, the equipment management apparatus 200 is an example of a management apparatus connected to the fuel cell system 310 via the wide area network. The EMS 320 is an example of a management apparatus connected to the fuel cell system 310 via the narrow area network.

(Fuel Cell System)

Figure 2:
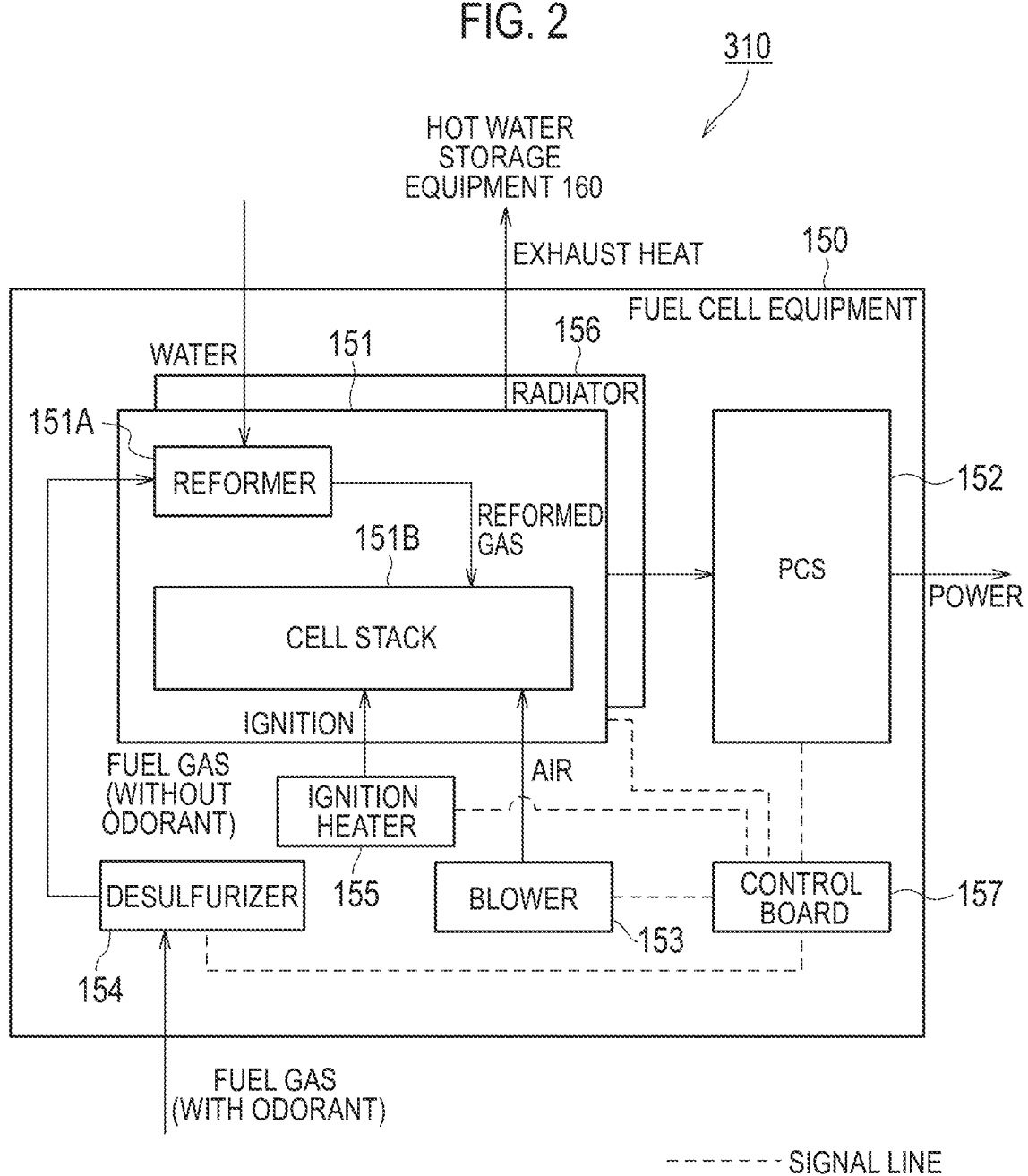
FIG. 2 is a diagram illustrating a fuel cell system 310 according to the embodiment.

The fuel cell system according to the embodiment will be described below. FIG. 2 is a diagram illustrating the fuel cell system 310 according to the embodiment. The fuel cell system 310 includes at least a fuel cell equipment 150. The fuel cell system 310 may include a hot-water storage equipment 160. Here, the description will be continued assuming that the fuel cell system 310 is a cogeneration system including both the fuel cell equipment 150 and the hot-water storage equipment 160.

The fuel cell equipment 150 is equipment that generates power by using fuel gas. The hot-water storage equipment 160 is equipment that uses fuel gas to generate hot water or maintain a water temperature. Specifically, the hot-water storage equipment 160 has a hot-water storage tank, and uses heat generated by fuel combustion or exhaust heat generated by power generation of the fuel cell equipment 150 to warm water supplied from the hot-water storage tank and return the warmed water to the hot-water storage tank.

As illustrated in FIG. 2, the fuel cell equipment 150 has a fuel cell 151, a PCS 152, a blower 153, a desulfurizer 154, an ignition heater 155, a radiator 156, and a control board 157.

The fuel cell 151 is equipment that generates power by using fuel gas. Specifically, the fuel cell 151 has a reformer 151A and a cell stack 151B.

The reformer 151A generates reformed gas from fuel from which odorant has been removed by the desulfurizer 154 described later. The reformed gas is a gas containing hydrogen and carbon monoxide.

The cell stack 151B generates power by using a chemical reaction between air (oxygen) supplied from the blower 153, which will be described later, and the reformed gas. Specifically, the cell stack 151B has a structure in which a plurality of cells is stacked. Each cell has a structure in which an electrolyte is sandwiched between a fuel electrode and an air electrode. Reformed gas (hydrogen) is supplied to the fuel electrode, and air (oxygen) is supplied to the air electrode. A chemical reaction between the reformed gas (hydrogen) and the air (oxygen) occurs in the electrolyte, thereby generating power (DC power) and heat.

The PCS 152 is equipment (power conditioning system) that converts DC power output from the fuel cell 151 into AC power.

The blower 153 supplies air to the fuel cell 151 (the cell stack 151B). The blower 153 includes, for example, a fan. The blower 153 cools the cell stack 151B so that the temperature of the cell stack 151B does not exceed an upper limit of an allowable temperature.

The desulfurizer 154 removes odorant contained in fuel gas supplied from outside. The fuel gas may be city gas or propane gas.

The ignition heater 155 is a heater that ignites fuel gas that has not chemically reacted in the cell stack 151B (hereinafter referred to as unreacted gas) and maintains the temperature of the cell stack 151B at a high temperature. That is, the ignition heater 155 ignites unreacted gas leaking from an opening of each cell constituting the cell stack 151B. It should be noted that, in a case where the unreacted gas has not burnt (e.g., at startup of the fuel cell equipment 150), the ignition heater 155 may ignite the unreacted gas. Then, after the unreacted gas has started to burn, the unreacted gas overflowing from the cell stack 151B little by little continues to burn. Thus, the temperature of the cell stack 151B is maintained at a high temperature.

The radiator 156 cools water flowing from the hot-water storage equipment 160 into the fuel cell equipment 150 (hereinafter referred to as the reflux water) so that the temperature of the reflux water does not exceed an upper limit of an allowable temperature. The radiator 156 may cool the cell stack 151B so that the temperature of the cell stack 151B does not exceed the upper limit of the allowable temperature.

The control board 157 is a board on which a circuit that controls the fuel cell 151, the PCS 152, the blower 153, the desulfurizer 154, the ignition heater 155, and the control board 157 is mounted.

The reformer 151A, the blower 153, the desulfurizer 154, the ignition heater 155, and the control board 157 are examples of auxiliaries that assist operation of the cell stack 151B. Further, a part of the PCS 152 may be treated as an auxiliary.

Operation states of the fuel cell system 310 include a power generation state (also referred to as during power generation), a stop state (also referred to as during stop), a startup state (also referred to as during startup), a stopping state (also referred to as during stopping), an idle state (also referred to as during idling), and the like.

The power generation state is a state where the fuel cell 151 is generating power. The startup state is a state of transition from the stop state to the power generation state. The stop state is a state where operation of the fuel cell 151 has stopped. The stopping state is a state of transition from the power generation state to the stop state. The idle state is a state where power is not output from the fuel cell system 310, but the temperature of the cell stack 151B is maintained at a predetermined temperature. The predetermined temperature may be substantially equal to the power generation temperature (e.g., 650° C. to 1000° C.) of the cell stack 151B in the power generation state, or may be a temperature lower than the power generation temperature (e.g., 450° C. to 600° C.). In the idle state, power for the auxiliaries may be covered by power output from the fuel cell 151, may be covered by another distributed power supply (e.g., equipment that generates power by utilizing natural energy, or storage battery equipment), or may be covered by power supplied from the power grid 110.

In an example illustrated in FIG. 2, the control board 157 is disposed in the fuel cell equipment 150. However, the embodiment is not limited to this. The fuel cell system 310 may include a remote controller that accepts user operations, and the control board 157 may be disposed in the remote controller. Alternatively, functions of the control board 157 may be implemented by both a board disposed in the fuel cell equipment 150 and the remote controller. Furthermore, the control board 157 may be considered as a part of the PCS 152.

In the embodiment, the control board 157 constitutes a controller that determines whether a condition relating to a stop pattern of the fuel cell system 310 satisfies a predetermined condition. The controller includes a CPU and a memory. The control board 157 constitutes an output unit that outputs a warning when it is determined that the condition relating to the stop pattern satisfies the predetermined condition. The output unit may include a communication module. The output unit may include at least one of an image processing IC and a sound processing IC.

Here, stopping of the fuel cell system 310 includes a normal stop and an abnormal stop. The normal stop is an operation to stop operation of the fuel cell system 310 by stopping power generation by the fuel cell 151, without stopping the blower 153 or the radiator 156, while lowering the temperature of the cell stack 151B by using the blower 153 or the radiator 156. On the other hand, the abnormal stop is an operation that stops not only power generation by the fuel cell 151 but also the entire operation of the fuel cell system 310. The normal stop is, for example, an operation performed in response to a relatively minor abnormality, or an operation performed in periodic maintenance of the fuel cell system 310. On the other hand, the abnormal stop is, for example, an operation performed in response to a relatively serious abnormality, or an operation performed in a state where a normal stop cannot be performed.

Furthermore, stopping of the fuel cell system 310 includes a manual stop and an automatic stop. The manual stop is caused by a user operation. The automatic stop is caused by a stop function of the fuel cell system 310. The automatic stop is performed automatically by the fuel cell system 310, without requiring a user operation. The manual stop includes the normal stop and the abnormal stop described above. Similarly, the automatic stop includes the normal stop and the abnormal stop described above. Furthermore, stopping of the fuel cell system 310 may include an operation of stopping the fuel cell system 310 by remote control from the equipment management apparatus 200. Such an operation may be counted as a manual stop, or may be counted as an automatic stop.

The abnormal stop may be, for example, performed in response to an event where the concentration of gas in the fuel cell system 310 is outside a predetermined range, performed in response to an event where the concentration of CO in the fuel cell system 310 exceeds an upper limit threshold, or performed in response to an event where the temperature of a component (e.g., a cell stack or a fuel catalyst) disposed in the fuel cell system 310 exceeds an upper limit threshold (high temperature abnormality). The concentration of gas, the concentration of CO, and the temperature of the component may be detected by sensors disposed in the fuel cell system 310. The abnormal stop may be an automatic stop in which the fuel cell system 310 automatically stops in accordance with a detection result of a sensor, or may be a manual stop in which the fuel cell system 310 is stopped by a user operation based on a notification of a detection result of a sensor to a user. Furthermore, the abnormal stop may be, for example, performed in response to an abnormality of a component (e.g., a sensor, the blower 153, or the radiator 156) disposed in the fuel cell system 310. The abnormal stop may be an automatic stop in which the fuel cell system 310 automatically stops in accordance with a detection result of an abnormality of a component, or may be a manual stop in which the fuel cell system 310 is stopped by a user operation based on a notification of a detection result of an abnormality of a component to a user. Further, the abnormal stop may be referred to as a shutdown.

The normal stop is a stop other than the abnormal stop. The normal stop may be, for example, performed in response to an event in which the temperature of a component (e.g., a cell stack) disposed in the fuel cell system 310 falls below a lower limit threshold (low temperature abnormality). The temperature of the component may be detected by a sensor disposed in the fuel cell system 310. The normal stop may be an automatic stop in which the fuel cell system 310 automatically stops in accordance with a detection result of a sensor, or may be a manual stop in which the fuel cell system 310 is stopped by a user operation based on a notification of a detection result of a sensor to a user. Furthermore, the normal stop may be performed in response to a communication abnormality. The communication abnormality may be a communication abnormality between components, such as the PCS 152, the control board 157, and the remote controller, disposed in the fuel cell system 310, or may be a communication abnormality between the fuel cell system 310 and the EMS 320. The communication abnormality may be an abnormality in which a state where communication is not possible continues for at least a predetermined time. The normal stop may be an automatic stop in which the fuel cell system 310 automatically stops in accordance with a detection result of a communication abnormality, or may be a manual stop in which the fuel cell system 310 is stopped by a user operation based on a notification of a detection result of a communication abnormality to a user. The normal stop may be performed in response to an abnormality of the power grid 110. The abnormality of the power grid 110 may be a power failure, or may be an abnormality in grid voltage and grid frequency. The normal stop may be an automatic stop in which the fuel cell system 310 automatically stops in accordance with a detection result of an abnormality of the power grid 110, or may be a manual stop in which the fuel cell system 310 is stopped by a user operation based on a notification of a detection result of an abnormality of the power grid 110 to a user.

The fuel cell system 310 includes the fuel cell equipment 150 in which an upper limit of the number of stops is set. The upper limit of the number of stops may differ depending on the type of stop. For example, an upper limit of the number of normal stops and an upper limit of the number of abnormal stops may be set individually. An upper limit of the number of normal stops triggered by a manual stop and an upper limit of the number of normal stops triggered by an automatic stop may be set individually. An upper limit of the number of abnormal stops triggered by a manual stop and an upper limit of the number of abnormal stops triggered by an automatic stop may be set individually. The upper limit of the number of normal stops may be larger than the upper limit of the number of abnormal stops. The number of normal stops may be the number of normal stops triggered by a manual stop, may be the number of normal stops triggered by an automatic stop, or may be a total of the number of normal stops triggered by a manual stop and the number of normal stops triggered by an automatic stop. Similarly, the number of abnormal stops may be the number of abnormal stops triggered by a manual stop, may be the number of abnormal stops triggered by an automatic stop, or may be a total of the number of abnormal stops triggered by a manual stop and the number of abnormal stops triggered by an automatic stop.

The stop pattern described above may include a record of times when stop processing of the fuel cell system 310 was performed since installation of the fuel cell system 310 in the facility 300. The stop pattern may include types of stop processing (e.g., normal stop, abnormal stop, manual stop, and automatic stop).

The predetermined condition described above may be that the number of stops of the fuel cell system 310 in a unit time exceeds a threshold. The number of stops may be the number of manual stops, the number of automatic stops, or a total of the number of automatic stops and the number of manual stops. The number of stops may be the number of normal stops, the number of abnormal stops, or a total of the number of normal stops and the number of abnormal stops. The unit time is not particularly restrictive, and may be one day, one week, or one month. It is consequently possible to suppress a situation where stop processing of the fuel cell system 310 is frequently performed. For example, even in a case of a user who is unfamiliar with handling of the fuel cell system 310, it is possible to suppress a situation where the user frequently performs an unnecessary manual stop.

The predetermined condition described above may be that a time interval between an (n−1)th stop of the fuel cell system 310 and an nth stop of the fuel cell system 310 is shorter than a predetermined threshold, n being the number of stops counted from the time of installation of the fuel cell system 310 in the facility 300. Further, in a case where an existing fuel cell equipment 150 has been replaced with a new fuel cell equipment 150 for maintenance after installation of the fuel cell system 310 in the facility 300, the predetermined condition described above may be that a time interval between an (n−1)th stop of the fuel cell system 310 and an nth stop of the fuel cell system 310 is shorter than a predetermined threshold, n being the number of stops counted from the time of the replacement with the new fuel cell equipment 150. Those stops may be manual stops, automatic stops, or both automatic stops and manual stops. Those stops may be normal stops, abnormal stops, or both normal stops and abnormal stops. It is consequently possible to suppress a situation where stop processing of the fuel cell system 310 is frequently performed. For example, even in a case of a user who is unfamiliar with handling of the fuel cell system 310, it is possible to suppress a situation where the user frequently performs an unnecessary manual stop.

The predetermined condition described above may be that the stop pattern is repeated with regularity. The regularity may be, for example, caused by a user's behavior pattern (e.g., at home/absence). Thus, the regularity may be that the fuel cell system 310 stops during specific times of the day (e.g., daytime), specific days of the week (e.g., weekdays), specific days of the month (e.g., weekends and holidays), or a specific period of the year (long-term holiday). It is consequently possible to suppress a situation where unnecessary stop processing of the fuel cell system 310 is performed for reasons such as absence. For example, even in a case of a user who is unfamiliar with handling of the fuel cell system 310, it is possible to suppress a situation where the user frequently performs an unnecessary manual stop.

The predetermined condition described above may be that the fuel cell system 310 is stopped with the fuel cell system 310 ready for automatic restart. The state of being ready for automatic restart is an idle state where the fuel cell system 310 has stopped power generation and is waiting for an operation for power generation start to be automatically performed. That is, the predetermined condition may be that a manual stop is performed even though power generation is to be automatically resumed. It is consequently possible to suppress a situation where stop processing of the fuel cell system 310 is frequently performed.

The predetermined condition described above may be that there is a predetermined correlation between a detection result of a sensor disposed in the fuel cell system 310 and a stop of the fuel cell system 310. The predetermined correlation may be that a manual stop is performed even though the detection result of the sensor satisfies the condition for performing an automatic stop. It is consequently possible to suppress a situation where stop processing of the fuel cell system 310 is duplicated.

The control board 157 may transmit an alarm (hereinafter referred to as an alarm message) to a management apparatus (e.g., the EMS 320) connected to the fuel cell system 310 via the narrow area network. Further, the "alarm" may be read as a "warning". The control board 157 may transmit the alarm message to a management apparatus (e.g., the equipment management apparatus 200) connected to the fuel cell system 310 via the wide area network. In such a case, the control board 157 may transmit the alarm message to the equipment management apparatus 200 via the EMS 320, or may transmit the alarm message to the equipment management apparatus 200 not via the EMS 320. Furthermore, the control board 157 may transmit the alarm message to the predetermined terminal 400 via the narrow area network, or may transmit the alarm message to the predetermined terminal 400 via the wide area network. In such a case, the control board 157 may transmit the alarm message to the predetermined terminal 400 via both the narrow area network and the wide area network, or may transmit the alarm message to the predetermined terminal 400 not via the narrow area network but via the wide area network (e.g., a mobile communication network).

The control board 157 may output an alarm to a remote controller disposed in the fuel cell system 310. The control board 157 may perform control for displaying the alarm on a display of the remote controller, or may perform control for outputting the alarm from a speaker of the remote controller.

(Equipment Management Apparatus)

Figure 3:
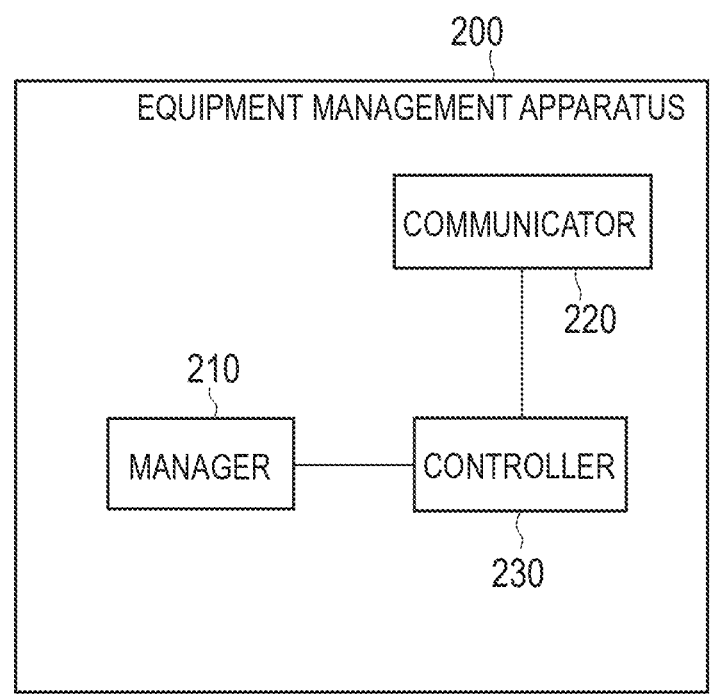
FIG. 3 is a diagram illustrating an equipment management apparatus 200 according to the embodiment.

Hereinafter, an equipment management apparatus according to the embodiment will be described. As illustrated in FIG. 3, the equipment management apparatus 200 includes a manager 210, a communicator 220, and a controller 230.

The manager 210 is configured with a storage medium, such as a non-volatile memory and/or an HDD, and manages information on a plurality of the facilities 300.

The manager 210 may store basic information of equipment provided in each of a plurality of the facilities 300. For example, the manager 210 stores a facility name, a facility ID, an equipment name, an equipment ID, an introduction year, aging, and a useful life by associating them with each other. The facility name is a name of the facility 300 where the equipment is installed. The facility ID is an identifier for identifying the facility 300. The equipment name is a name of equipment. The equipment ID is an identifier for identifying equipment. The introduction year is a year in which equipment is introduced. The aging indicates years that have passed since introduction of equipment. The useful life is determined by a manufacturer of equipment, and the like, and is information indicating a period in which equipment can be used appropriately after the equipment is introduced.

The manager 210 may store, for each of a plurality of the facilities 300, maintenance information of equipment provided in each of a plurality of the facilities 300. For example, the manager 210 stores a facility name, an equipment name, a maintenance date, a maintenance outline, and a maintenance detail by associating them with each other. The manager 210 may store a facility ID and an equipment ID by associating them with each other together with these pieces of information. The facility name and the equipment name are as described above. The maintenance date is a date on which maintenance is performed. The maintenance outline is information indicating an outline of maintenance, and the maintenance detail is information indicating the details of maintenance. The maintenance information according to the embodiment preferably includes at least a maintenance period (planned) for performing maintenance of equipment in the future. The maintenance information may include a maintenance period in which maintenance of equipment is performed in the past.

Here, the maintenance includes, for example, an inspection for examining a deterioration state of equipment, maintenance for performing minor maintenance at the time of inspection, a repair for dealing with a failure of equipment, replacement for replacing existing equipment with new equipment, and the like.

The communicator 220 includes a communication module, and communicates with the facility 300 and the predetermined terminal 400 via the network 120. The communicator 220 receives the alarm message described above from the fuel cell system 310. The communicator 220 may receive the alarm message via the EMS 320, or may receive the alarm message not via the EMS 320.

The controller 230 includes a memory, a CPU, and the like, and controls each component disposed in the equipment management apparatus 200. The controller 230 may perform control for arranging maintenance of the fuel cell system 310 on the basis of the state of the fuel cell system 310.

(Equipment Management Method)

The equipment management method according to the embodiment will be described below.

As illustrated in FIG. 4, in step S11, the fuel cell system 310 stops due to the normal stop (including manual stop and automatic stop) or the abnormal stop (including manual stop and automatic stop) described above.

In step S12, the fuel cell system 310 determines whether the condition relating to the stop pattern of the fuel cell system 310 satisfies the predetermined condition. Details of the stop pattern and the predetermined condition are as described above. Here, a case will be described in which the condition relating to the stop pattern satisfies the predetermined condition.

In step S13, the fuel cell system 310 transmits an alarm message to the EMS 320.

In step S14, the EMS 320 transmits the alarm message to the equipment management apparatus 200. Step S14 may be omitted.

In a sequence illustrated in FIG. 4, the alarm message is transmitted to the EMS 320, but the embodiment is not limited to this. The fuel cell system 310 may transmit the alarm message to the equipment management apparatus 200 not via the EMS 320, or may transmit the alarm message to the predetermined terminal 400. The fuel cell system 310 may output an alarm to the remote controller.

(Functions and Effects)

In the embodiment, the fuel cell system 310 is configured to output an alarm when a condition relating to a stop pattern of the fuel cell system 310 satisfies a predetermined condition. Thus, a situation where the fuel cell system 310 stops frequently can be suppressed. In particular, in a case where the fuel cell system 310 can be operated by a user, an unnecessary stop triggered by a user operation can be suppressed.

Other Embodiments

The present invention has been described based on the embodiment described above. However, a statement and the drawings constituting part of the disclosure should not be understood as limiting the present invention. This disclosure will clarify a variety of alternative embodiments, examples, and operation techniques for a person skilled in the art.

In the embodiment, the manager 210 is provided in the equipment management apparatus 200, but the embodiment is not limited to this. For example, the manager 210 may be provided in a server connected to the equipment management apparatus 200 via the network 120.

The embodiment illustrates a case where the control board 157 determines whether a condition relating to a stop pattern satisfies a predetermined condition. However, the embodiment is not limited to this. The determination may be made by the EMS 320 or the equipment management apparatus 200. In a case where the determination is made by the EMS 320, the control board 157 may output a condition relating to a stop pattern to the EMS 320. Further, in a case where the determination is made by the equipment management apparatus 200, the EMS 320 may receive a condition relating to a stop pattern from the control board 157, and then output the condition relating to the stop pattern to the equipment management apparatus 200. The output of the condition relating to the stop pattern from the control board 157 to the EMS 320 and the output of the condition relating to the stop pattern from the EMS 320 to the equipment management apparatus 200 may be performed every predetermined period from the time of installation of the fuel cell system 310, may be performed every time the fuel cell system 310 stops, or may be performed every time the number of stops reaches a predetermined number. In a case where the determination is made by the EMS 320 or the equipment management apparatus 200, it may also be considered that the output of the alarm is also performed by the EMS 320 or the equipment management apparatus 200. The EMS 320 or the equipment management apparatus 200 may be considered to constitute a part of the fuel cell system.

In the embodiment, the fuel cell system 310 communicates with the equipment management apparatus 200 via the EMS 320. However, the embodiment is not limited to this. The EMS 320 may not be disposed, and the fuel cell system 310 may communicate directly with the equipment management apparatus 200.

Although not particularly mentioned in the embodiment, the EMS 320 disposed in the facility 300 may not be necessarily disposed in the facility 300. For example, some functions of the EMS 320 may be provided by a cloud server disposed on the Internet. That is, it may be considered that a local control apparatus 360 includes the cloud server. The EMS 320 may be considered as the power management server described above.

The embodiment illustrates a case where the condition relating to the stop pattern is the stop pattern itself. However, the embodiment is not limited to this. The condition relating to the stop pattern may be a startup pattern. Since startup is inextricably associated with stop, the startup pattern is substantially synonymous with the stop pattern. In such a case, "stop" in the embodiment may be read as "startup".

In a case where an existing fuel cell equipment 150 has been replaced with a new fuel cell equipment 150 for maintenance, a component that determines whether a condition relating to a stop pattern satisfies a predetermined condition may manage a condition relating to a stop pattern of the new fuel cell equipment 150 with a condition relating to a stop pattern of the existing fuel cell equipment 150 kept stored, or may update the condition relating to the stop pattern of the existing fuel cell equipment 150 with the condition relating to the stop pattern of the new fuel cell equipment 150.

The fuel cell equipment 150 is a solid oxide fuel cell (SOFC). However, the fuel cell equipment 150 may be a polymer electrolyte fuel cell (PEFC), a phosphoric acid fuel cell (PAFC), or a molten carbonate fuel cell (MCFC).

Note that the entire content of Japanese Patent Application No. 2017-146463 (filed on Jul. 28, 2017) is incorporated herein by reference.

The invention claimed is:

1. A fuel cell system comprising:
a controller configured to determine whether a condition relating to a stop pattern of the fuel cell system satisfies a predetermined condition; and
an output unit configured to output a warning when it is determined that the condition relating to the stop pattern satisfies the predetermined condition,
wherein
the predetermined condition is at least one of:
that a time interval from an (n−1)th manual stop of the fuel cell system to an nth manual stop of the fuel cell system is shorter than a predetermined threshold;
that a manual stop pattern is repeated according to a predetermined pattern or rule;
that a manual stop of the fuel cell system is executed in a state where the fuel cell system is automatically restartable, wherein the state is an idle state where the fuel cell system has stopped power generation and is waiting for an operation for power generation start to be automatically performed; or
that there is a predetermined correlation between a detection result of a sensor provided in the fuel cell system and a stop of the fuel cell system, wherein the predetermined correlation is that a manual stop is performed even though the detection result of the sensor satisfies the condition for performing an automatic stop.

2. The fuel cell system according to claim 1, wherein the output unit is configured to transmit the warning to a management apparatus connected to the fuel cell system via a narrow area network.

3. The fuel cell system according to claim 1, wherein the output unit is configured to transmit the warning to a management apparatus connected to the fuel cell system via a wide area network.

4. The fuel cell system according to claim 1, further comprising a remote controller configured to be operated by a user, wherein
the output unit is configured to output the warning to the remote controller.

5. The fuel cell system according to claim 1, wherein the stop pattern includes a record of times of executing a stop process of the fuel cell system.

6. The fuel cell system according to claim 1, further comprising fuel cell equipment in which an upper limit of a number of stops is set.

7. An equipment management method comprising the steps of:
determining whether a condition relating to a stop pattern of a fuel cell system satisfies a predetermined condition; and
outputting a warning when it is determined that the condition relating to the stop pattern satisfies the predetermined condition,
wherein
the predetermined condition is at least one of:
that a time interval from an (n−1)th manual stop of the fuel cell system to an nth manual stop of the fuel cell system is shorter than a predetermined threshold;
that a manual stop pattern is repeated according to a predetermined pattern or rule;
that a manual stop of the fuel cell system is executed in a state where the fuel cell system is automatically restartable, wherein the state is an idle state where the fuel cell system has stopped power generation and is waiting for an operation for power generation start to be automatically performed; or
that there is a predetermined correlation between a detection result of a sensor provided in the fuel cell system and a stop of the fuel cell system, wherein the predetermined correlation is that a manual stop is performed even though the detection result of the sensor satisfies the condition for performing an automatic stop.

8. A management apparatus connected to a fuel cell system via at least one of a narrow area network and a wide area network, the management apparatus comprising a receiver configured to receive a warning when a condition relating to a stop pattern of the fuel cell system satisfies a predetermined condition,
  wherein the predetermined condition is at least one of:
    that a time interval from an (n−1)th manual stop of the fuel cell system to an nth manual stop of the fuel cell system is shorter than a predetermined threshold;
    that a manual stop pattern is repeated according to a predetermined pattern or rule;
    that a manual stop of the fuel cell system is executed in a state where the fuel cell system is automatically restartable, wherein the state is an idle state where the fuel cell system has stopped power generation and is waiting for an operation for power generation start to be automatically performed; or
    that there is a predetermined correlation between a detection result of a sensor provided in the fuel cell system and a stop of the fuel cell system, wherein the predetermined correlation is that a manual stop is performed even though the detection result of the sensor satisfies the condition for performing an automatic stop.

9. An equipment management system comprising:
a fuel cell system;
a management apparatus connected to the fuel cell system via at least one of a narrow area network and a wide area network;
a controller configured to determine whether a condition relating to a stop pattern of the fuel cell system satisfies a predetermined condition; and
an output unit configured to output a warning to the management apparatus when it is determined that the condition relating to the stop pattern satisfies the predetermined condition, wherein the predetermined condition is at least one of:
  that a time interval from an (n−1)th manual stop of the fuel cell system to an nth manual stop of the fuel cell system is shorter than a predetermined threshold;
  that a manual stop pattern is repeated according to a predetermined pattern or rule;
  that a manual stop of the fuel cell system is executed in a state where the fuel cell system is automatically restartable, wherein the state is an idle state where the fuel cell system has stopped power generation and is waiting for an operation for power generation start to be automatically performed; or
  that there is a predetermined correlation between a detection result of a sensor provided in the fuel cell system and a stop of the fuel cell system, wherein the predetermined correlation is that a manual stop is performed even though the detection result of the sensor satisfies the condition for performing an automatic stop.

* * * * *